Dec. 1, 1925.  1,563,964
A. F. CARLSON
LASTING MACHINE
Filed July 2, 1924  10 Sheets-Sheet 1

Inventor
Axel Folke Carlson
by Rogers, Kennedy & Campbell,
Attys.

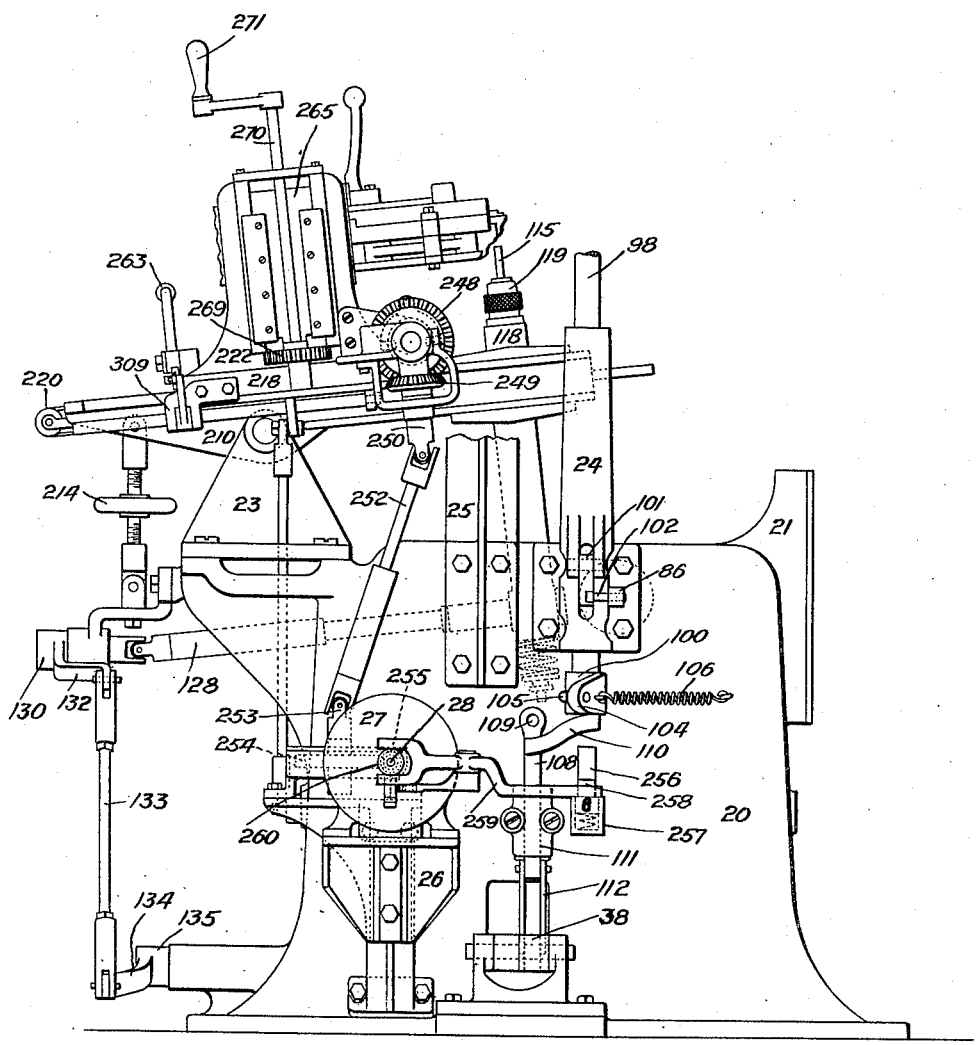

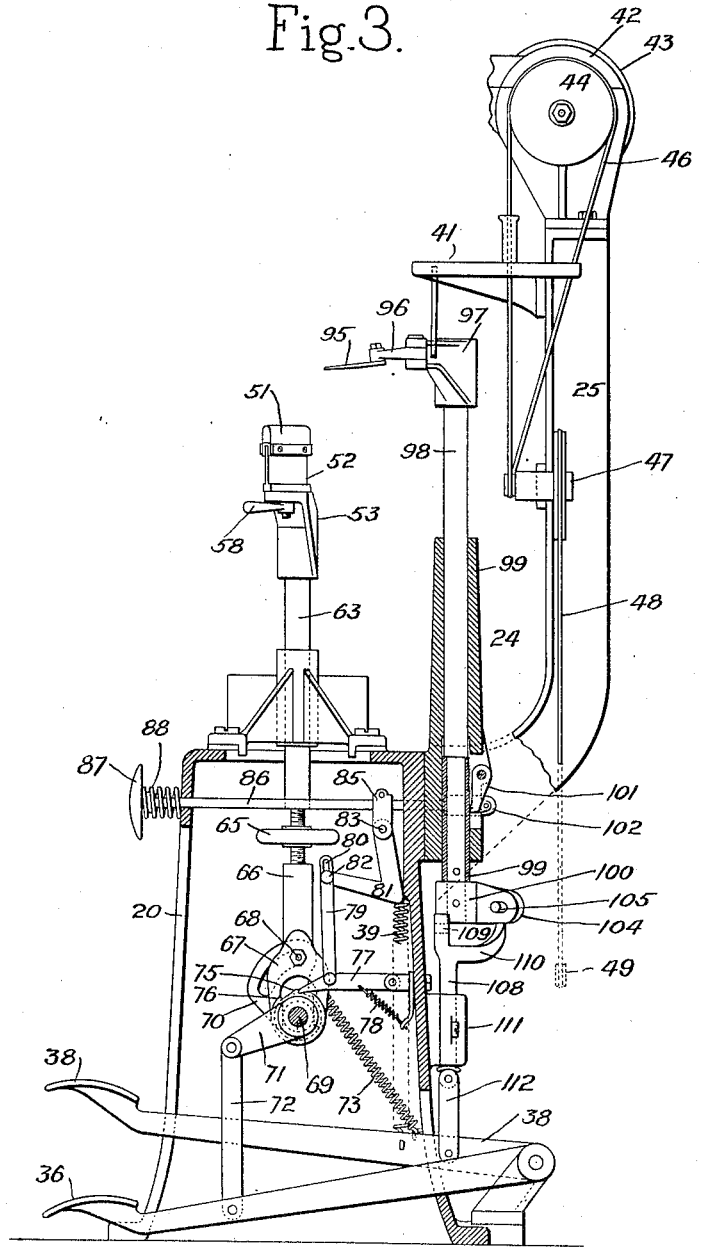

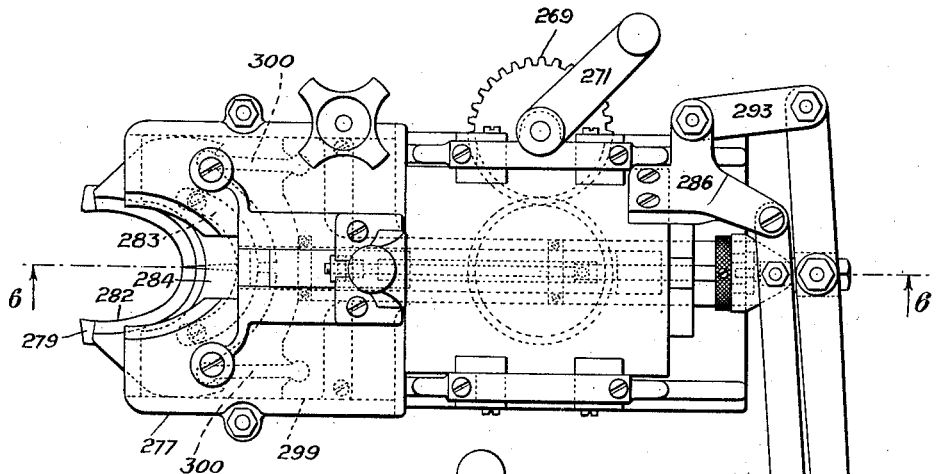
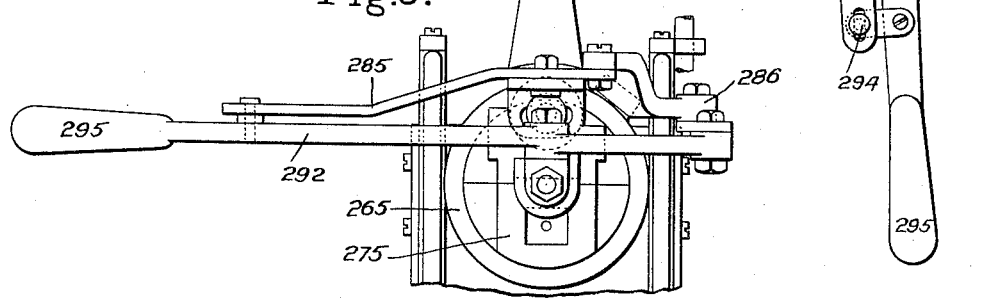
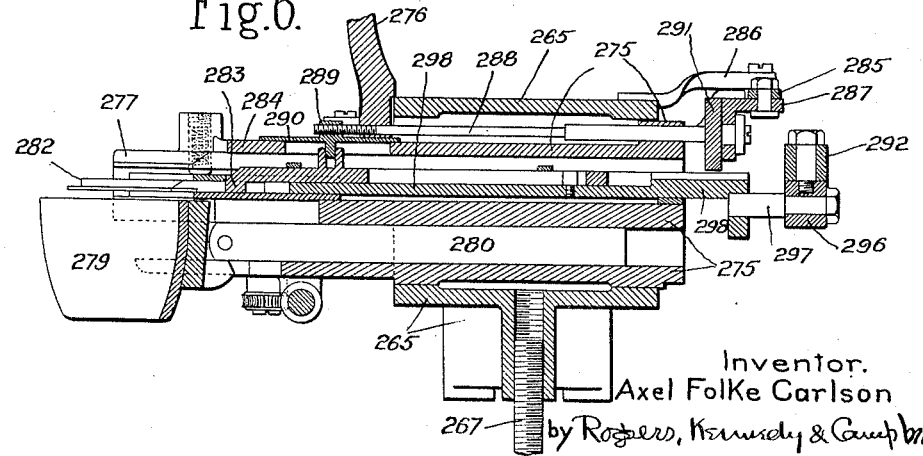

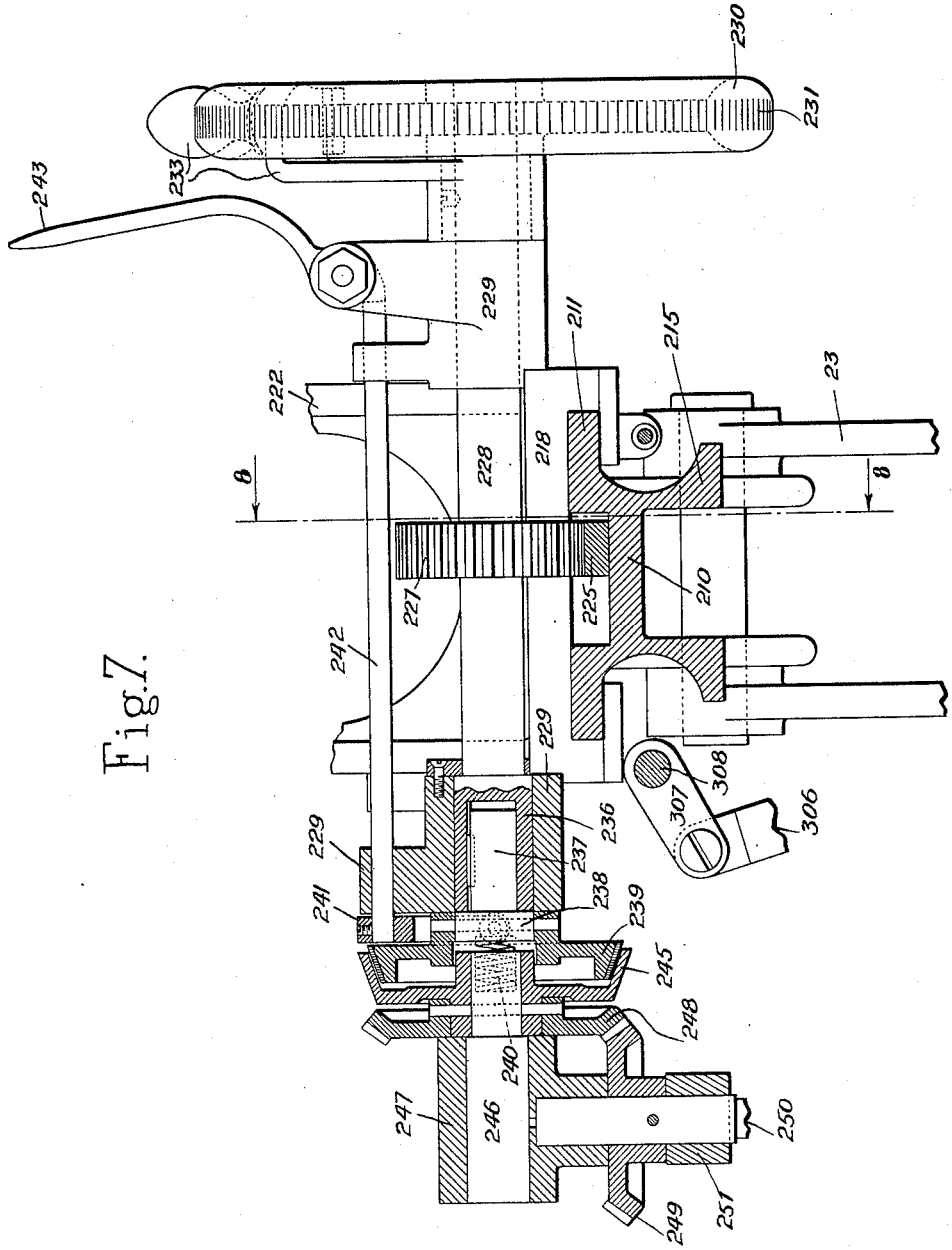

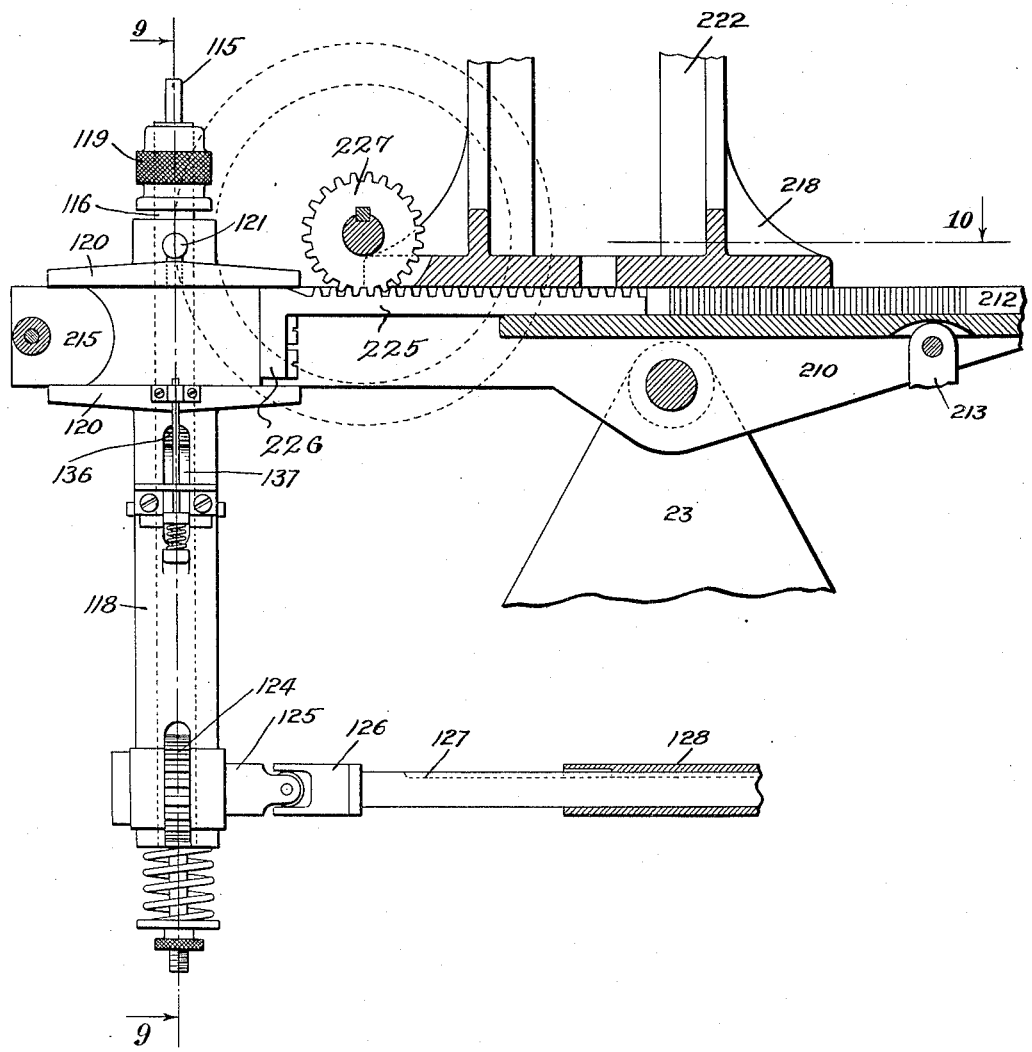

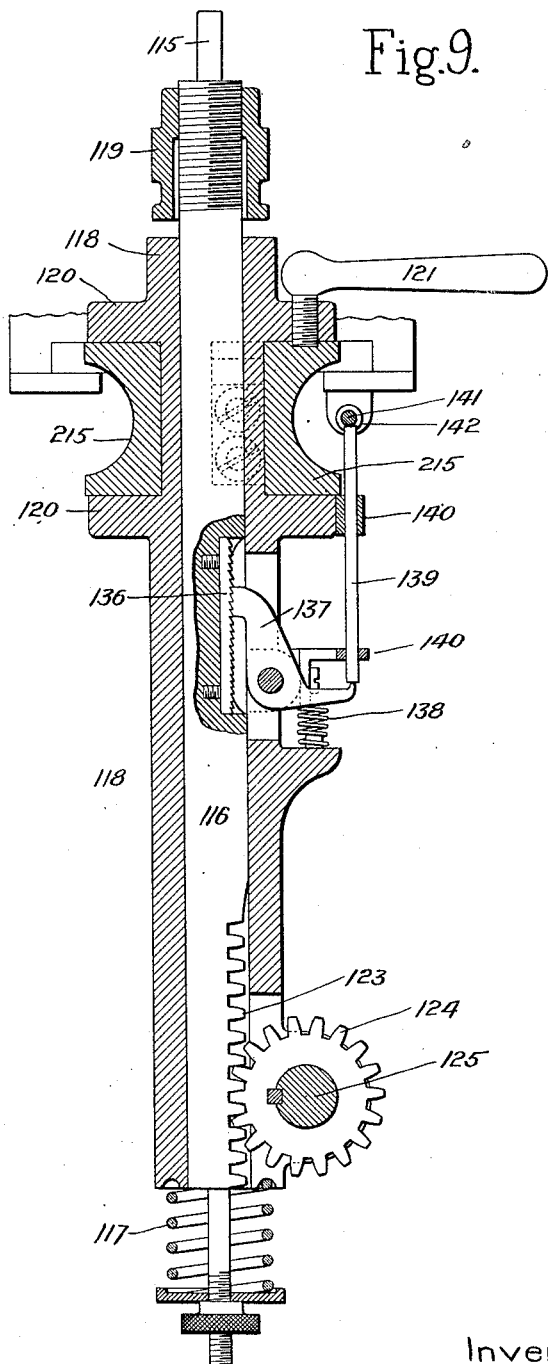

Dec. 1, 1925.  1,563,964
A. F. CARLSON
LASTING MACHINE
Filed July 2, 1924   10 Sheets-Sheet 8

Inventor.
Axel Folke Carlson
by Rogers, Kennedy & Campbell.
Attys.

Inventor.
Axel Folke Carlson

Dec. 1, 1925.
A. F. CARLSON
1,563,964
LASTING MACHINE
Filed July 2, 1924
10 Sheets-Sheet 10

Inventor.
Axel Folke Carlson
by Rogers, Kennedy & Campbell,
Attys.

Patented Dec. 1, 1925.

1,563,964

UNITED STATES PATENT OFFICE.

AXEL FOLKE CARLSON, OF CAMBRIDGE, MASSACHUSETTS, ASSIGNOR TO REECE SHOE MACHINERY COMPANY, OF BOSTON, MASSACHUSETTS, A CORPORATION OF MAINE.

LASTING MACHINE.

Application filed July 2, 1924. Serial No. 723,692.

*To all whom it may concern:*

Be it known that I, AXEL FOLKE CARLSON, a subject of the King of Sweden, residing in Cambridge, county of Middlesex, and State of Massachusetts, have invented certain new and useful Improvements in Lasting Machines, of which the following is a specification.

This invention is a novel lasting machine for shoes, and involves various features of improvement, with relation to the shoe holding means, and the wiping means for forcing and smoothing the overhanging upper into place about the last and sole. While the features of improvement could be employed in different types of lasting machine they are herein shown embodied in a so-called bed lasting machine, in which the inverted shoe is inserted after having been pulled over and in which, while the shoe is firmly held in position, both the heel and toe portions of the shoe upper are wiped and secured in place preparatory to subsequent operations upon the shoe.

A typical example of a bed lasting machine is shown in prior patents of Perri, Numbers 1,222,125 and 1,222,126 and 1,222,-127 of April 10, 1917, the first mentioned showing particularly the toe wiping mechanism, the second the shoe holding means and general combination and the third patent the heel wiping mechanism. The nearest structure on which the present invention is an improvement, so far as I know, would be a bed lasting machine similar to said Patent 1,222,126 but with heel and toe wiping mechanisms as in the patents of Perri Numbers 1,420,573 and 1,420,574 respectively of June 20, 1922.

The general object of the present invention is the improvement in various respects of the different parts or mechanisms of a lasting machine, including the general combination, the shoe holding means, the toe wiping mechanism and the heel wiping mechanism. The more specific objects and advantages will be pointed out in the hereinafter following description of one form or embodiment thereof or will be apparent to those skilled in the art. To the attainment of such objects and advantages the present invention consists in the novel lasting machine and the novel shoe holding, toe wiping, and heel wiping means, and features of combination, arrangement, mechanism and detail herein illustrated or described.

In the accompanying drawings forming a part hereof Fig. 1 is a front elevation of a bed lasting machine embodying the features of the present invention, showing the shoe supported and held near the center of the machine, with the heel wiping mechanism at the right end, the toe wiping mechanism at the left end, and the tack feeding and applying devices in the upper rear. The parts are shown in position with the shoe partly held but not in condition for wiping, the heel mechanism having been brought up to the shoe, but the hold-down or shoe clamping means not having yet been applied.

Fig. 2 is a general rear elevation but with the toe wiping mechanism and tacking devices omitted.

Fig. 3 is a right elevation, partly in section on the line 3—3 of Fig. 1, of the hold-down and toe rest devices and connections, and with the rear bracket and tack feeder indicated, although they would not properly show in this figure.

Fig. 4 is a top plan view of the heel wiping mechanism or head.

Fig. 5 is a right elevation of the parts seen in Fig. 4.

Fig. 6 is a central vertical section on the line 6—6 of Fig. 4.

Fig. 7 is a substantially vertical section of the heel wiping head taken on the line 7—7 of Fig. 1, looking toward the right.

Fig. 8 is a front elevation, partly in section on the line 8—8 of Fig. 7, showing the heel rest fittings and their relation to the heel wiping head.

Fig. 9 is a vertical section on the line 9—9 of Fig. 8.

Figure 1:
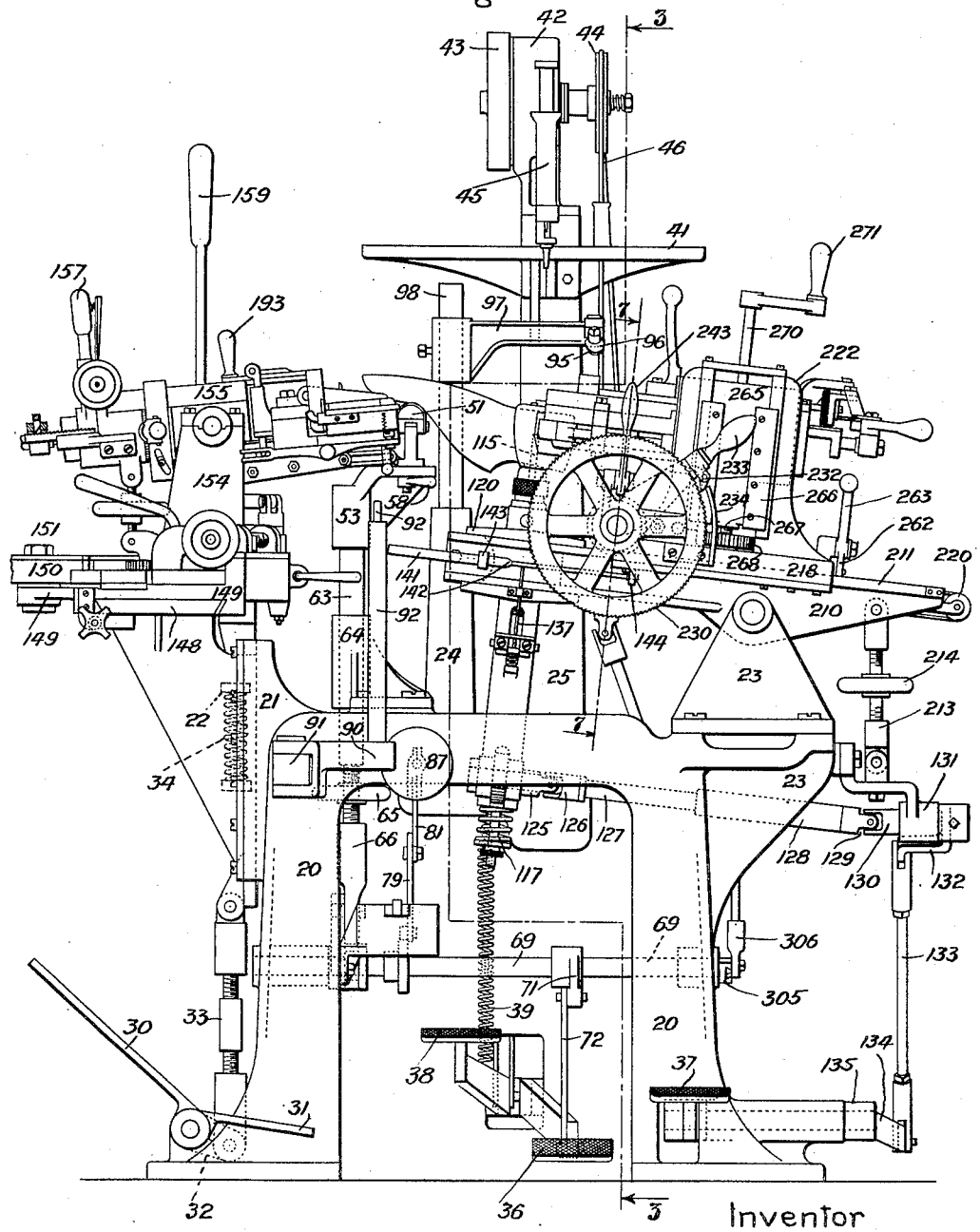

The frame base, or bed 20 of the machine, is shown as a hollow box like structure resting on the floor and having an arched front opening giving access to the interior mechanism. The left end of the bed supports a guide 21 on which slides upwardly and downwardly the support or bracket 22 which carries the entire toe wiping mechanism. The bed, at the other end, has an extension 23 which supports the entire heel wiping mechanism. At the rear is a hollow post 24 which constitutes a bearing or slideway for the hold-down device; also a tall post 25 supporting the tacking devices and an elevated shelf. As seen in the rear view Fig. 2 the back of the frame has a small shelf 26 supporting a motor 27, preferably electrically driven, affording power for effecting certain of the operations.

The machine is shown as operated through four pedals in addition to the power connections and various hand levers, wheels and the like. The pedal 30 is manipulated during the wiping of the toe end of the shoe, the depression of the pedal raising the wiping mechanism. The pedal has an extension 31 for depressing the wiping mechanism. The pedal shaft is connected through a rock arm 32 and a link 33 with the rising support 22 already mentioned. A spring 34, under compression, and pressing upwardly on the support 22 holds the wiping mechanism in a floating condition, so that it can be elevated by pedal 30 or depressed by extension 31.

The other pedals comprise a pedal 36, the depression of which elevates the toe rest on which the toe of the shoe is supported during wiping. The pedal 37 when depressed elevates the heel rest or spindle, as is necessary during the preliminary adjustment of the shoe to the wiping mechanisms. The pedal 38 operates to depress the hold-down, which effects a clamping action against the upturned sole of the shoe, forming, with the toe and heel rests, an effective shoe holding mechanism. The pedal 38 is constantly pulled upwardly by its spring 39. The other pedals are elevated by the indirect action of springs which will subsequently be described.

The tall post 25 is provided with a convenient shelf 41 slightly below the tack feeding mechanisms. The latter comprises a tack magazine 42 combined with a rotating tumbling cylinder 43 on the same shaft with a pulley 44. A tack driver 45 is shown, arranged to be hooked to the outlet chute of the magazine, or to be detached at will for driving tacks into the inturned margins of the shoe upper. The tack feeding mechanism is driven by a belt 46 connected through counter pulleys 47, see Fig. 3, and belt 48 with pulley 49 on the shaft of the motor 27. As no special claim is made to the tack feeding and driving devices the same are not illustrated or described in further detail.

The toe rest 51 is preferably in the nature of a pad, of any form, for example with leather outside enclosing elastic material or rubber. It may be spring supported on a support 52 in a manner to rock laterally to adjust itself to the shoe. The flanged base of the support 52 is movable upon a bracket member 53 having a flat top surface slotted at 54 to permit the pad member to be adjusted longitudinally upon the bracket. Preferably the toe rest support is capable not only of sliding but of rotating or swiveling upon the bracket. For this purpose the bottom of the support is recessed to receive a circular disk 55, indicated in Fig. 13, the disk having a hollow stem 56 extending downwardly through the slot 54, its lower end being threaded and provided with a nut 57, having for convenience a handle 58, by which the parts may be secured against longitudinal movement on the bracket. The support 52 may swivel or turn on the disk 55 and is held down in place by an interior spindle 60 having its upper end screwed into the upper part of the support 52 and its lower end slotted to receive a cotter pin, as shown. By this mechanism the toe rest or pad 51 may be adjusted into different positions along the bracket 53 and in any position may turn about its vertical axis.

The bracket 53 on which the toe rest is supported is shown mounted at the upper end of a vertical rod 63, see Figs. 1 and 3. This rod is capable of rotation in the bearing or bracket 64 so that the toe rest can be bodily swung forwardly or rearwardly, as when reversing the machine for right or left shoes. The rod 63 is also movable upwardly and downwardly so that the toe pad can be brought up into position for wiping operations and subsequently depressed. The rod 63 is connected by an adjusting device 65 with a lower extension 66, the adjustment permitting alteration of the operating position of the toe rest. The lower end of the rod 66 has a forked extension 67 and a cam stud or roll 68. The fork straddles and takes guidance from a rock shaft 69. The shaft is shown provided with a cam member 70, the slot of which engages the stud or follower 68, so that turning the shaft may elevate and lower the toe rest. In order to rock the shaft 69 it is provided with a rock arm 71 connected by a link 72 with the pedal 36 already mentioned. A spring 73 is arranged in a position to pull upon the cam member 70 thereby elevating the pedal and depressing the toe pad; depressing the pedal therefore elevates the toe pad.

After the shoe has been inserted and the toe pad raised it is desirable that the latter be held in position, and for this purpose a device such as the following may be used. The rock shaft 69 is shown provided with a notch or tooth 75, by which the toe rest is held elevated, as seen in Fig. 3, and it has a second similar tooth 76 which determines the lowered position of the parts. A pawl or dog 77, pulled upon by spring 78, engages one or the other of the teeth.

This invention embodies a novel tripping mechanism which may be operated at will to trip or release various parts of the mechanism, permitting them to return to initial position, among them the toe rest mechanism. For this purpose the pawl 77 has a link 79, the upper end of which has a slot 80 connecting it with a second link 81 through a pin 82 which may slide in the slot, thus giving delayed action. The link 81 has its upper end pivoted at 83 to a collar 85 adjustable on a rod 86. This may be considered as a trip rod, and it extends forwardly to where it has a trip button or enlargement 87 at its exterior end, with a spring 88 holding the parts forward in normal position. Pressing the knee against the button 87 throws the parts rearwardly. The peculiar shape of the link 81 enables its elbow to strike against the frame, thus lifting pin 82. If the trip rod is pressed all the way in the pin 82 will rise sufficiently to elevate the link 79 and dog 77, thus releasing the toe rest and permitting it to descend by gravity to original position.

Instead of employing the knee to press on the trip rod for releasing the various parts and extracting the shoe after a wiping operation it is preferred to provide a bunting device for this purpose, consisting of a movable member 90, shown as a lever fulcrumed at 91, having sufficient weight so that when swung against the button 87 it is capable of forcing the button rearwardly, for releasing purposes. This arrangement is an improvement over manual or knee operation as it enables an instantaneous releasing action, the trip rod operating and throwing the bunter outwardly. As will be described a light blow will release certain mechanisms, for example the hold-down, while a heavier blow will suffice to release also the toe rest and other mechanisms as will be described. The swinging bunter 90 is also useful as the support for an upstanding spindle 92, the reduced upper end of which is capable of being engaged by the spindle recess in the heel end of the ordinary last, so that a shoe can be temporarily engaged with the spindle 92 for various purposes. The spindle 92 also serves as a handle for operating the bunter as described.

The hold-down 95 may be a more or less resilient metallic member or finger arranged to be forced and clamped down upon the inverted shoe, cooperating with the toe and heel rests to hold the shoe during wiping. The hold-down 95 is shown secured to a swinging carrier 96, see Figs. 1 and 3, pivoted to an arm or head 97 rigid with the top end of a rod 98 capable both of rotating and vertically sliding in the post 24, already mentioned. The rod, near its lower end, is provided with a toothed sleeve 99, the teeth of which are exposed rearwardly through a suitable recess in the post 24. At its lower end the rod has an attached head 100. Cooperating with the toothed sleeve 99 is a pawl 101. When the hold-down is swung out over the shoe and brought forcibly down into position it will be held down by the engagement of pawl 101 with the toothed sleeve or rack 99.

When wiping operations are over and the shoe is to be removed it is desirable first to release the hold-down. For this purpose a connection 102 is shown between the rear end of the trip rod 86 and the pawl 101, see Fig. 2. This connection may consist of a pin rigid with the pawl and extending into an inclined slot in the trip rod, such that a slight extent of rearward movement of the trip rod retracts the pawl, the slot permitting further movement. By this arrangement the trip button 87 may be pressed or struck lightly to release only the hold-down.

The head 100 at the lower end of the hold-down supporting rod 98 has an extension 104 constituting a follower for a cam to be described, and this extension has a pin 105 by which the rod may be placed in engagement with the depressing pedal. A spring 106 is arranged to pull leftward on the extension 104, that is to the right in the rear view Fig. 2, thus tending to rotate the rod 98 and throw the hold-down rearwardly from over the shoe.

Below the head 100 is a vertical slide 108. This has a recess 109 adapted to receive the pin 105 when swung forwardly. It also carries a curved extension or cam 110 co-operating with the follower 104. The vertical slide 108 moves in a fixed slideway 111 and is connected by links 112 with the pedal 38. Manifestly the depression of the pedal is of no effect until the hold-down has been brought forward by hand to a position over the shoe. During this swinging motion the follower 104 moves forwardly along the cam 110, which so guides the movement that the pin 105 will enter the recess 109. With engagement thus effected the depression of the pedal pulls the hold-down forcibly upon the shoe, and it is there locked by the dog 101 as already described. A slight pressure upon the trip button 87 releases the entire mechanism and the parts all return to their original positions as shown.

Having described the toe rest and the hold-down there will next be described the third member of the shoe holding mechanism, namely, the shoe rest or spindle 115 and its fittings and connections, reference being had more particularly to Figs. 1, 2, 8 and 9. The spindle 115 is adapted to fit in the usual spindle hole in the heel portion of the last. Herein the spindle is formed or secured at the upper end of an upright shank 116, constantly pressed down by a spring 117 associated with its lower end. The spindle slides in an upright sleeve or slideway 118. The upper end of the heel spindle shank 116 is provided with an adjustable collar or nut 119, screw threaded to the shank and forming a stop, cooperating with the sleeve 118, to adjust and limit the normal lowered position of the heel spindle or rest. The sleeve or bearing 118 is formed or provided with a sliding carriage in the form of flanges or extensions 120 arranged to engage certain guiding members 215, as will hereinafter be described, so as to enable the heel spindle to be adjusted longitudinally, towards and from the toe wiping mechanism, in order to adapt the machine for shoes of varying lengths. This guide 215 is seen in Fig. 7 as well as the other figures mentioned. The adjustment is effected in connection with the movements of the heel wiping mechanism and the description will be deferred. When properly adjusted the carriage 120 and sleeve 118 will be fixed in position by a set screw 121.

The lifting and dropping movements of the heel spindle may be effected by the following mechanism. The shank 116 has a toothed rack 123 formed or attached near its lower end and exposed by reason of a suitable recess in the sleeve 118. This rack is engaged by a pinion 124, which may thus be rotated to elevate the heel spindle against the depressing force of the spring 117. The pinion 124 is secured on a short shaft 125 which is connected by a universal joint 126 with a longer longitudinal shaft 127, having a telescope and key connection with a hollow shaft or sleeve 128, the extreme right hand end of which is connected by a universal joint 129 with a short shaft 130 rotating in a bracket 131. The combined shaft portions 125, 127, 128 and 130 constitute a rock shaft universally adjustable and extensible. The rocking of this shaft turns the pinion 124 and elevates the heel spindle. For such purposes the shaft portion 130 is provided with a rearwardly extending rock arm 132, the end of which is connected by an adjustable link 133 with a rearwardly extending rock arm 134, mounted on the fulcrum shaft 135 of the heel spindle pedal 87. Thereby the depression of the pedal elevates the heel spindle. It will be understood that the raising of the heel spindle is done under observation, with the heel wiping mechanism adjacent, so as to bring the shoe to the proper relative elevation, also to permit the shoe to be forced upwardly after the heel wiper plates have moved in over the shoe, to put pressure upon the inturned leather margins.

When the heel spindle, carrying the last and shoe, is elevated as described, it is important to lock the spindle in such position. For this purpose the shank 116 is provided with a toothed rack 136 adapted to be engaged by a pawl 137, extending through a recess in the sleeve 118, to hold the parts in their elevated position, a spring 138 pressing the pawl into engagement with the rack.

Automatic disengagement of the pawl to release the heel spindle is desirable, and this invention contemplates that this shall be effected by the operation of the trip mechanism already described. For this purpose the pawl 137 has associated with it a tripping or releasing pin 139 supported in lower and upper bearings 140 and adapted to be thrust downwardly by an elongated cam or rod 141 having a shoulder 142 for the purpose. The larger portion of the rod slides in a bearing 143. The right or smaller end of the cam rod 141 is secured at 144 to the sliding base carriage of the heel wiping mechanism, so that when the latter is retracted, after the completion of a wiping operation, this will slide the rod cam to the right, the shoulder 142 coming into play to thrust down the release pin 139 and thus release and permit the descent of the heel spindle. Preferably the heel wiping mechanism is returned to the right automatically under control of the trip mechanism, which in this way causes the release of the heel spindle.

The toe wiping mechanism is shown more particularly in Figs. 1 and 13 to 18, reference to be had to prior Patent 1,420,574 for a number of details forming no part of the present invention. It has already been described how the rising support 22, lifted and lowered through the pedal 30, 31, carries the entire toe wiping mechanism. The support 22 is formed with a transverse track or dovetail guide 148, upon which the entire mechanism may be shifted bodily across the machine, that is from the front to the rear and vice versa, for the purpose of reversing the machine for right and left shoes, which it is desirable to treat alternately, so that two shoes of a pair may be handled in succession. Directly engaging the transverse track 148 is a base carriage 149, which extends outwardly to the left and supports a swinging carriage 150 fulcrumed at 151. The inner or right hand end of the swinging carriage is thus able to be swung transversely. On top of the swinging carriage is a rotary carriage or disk 152 by which the toe wiping head may be rotated to bring the wiping mechanism into proper alinement with the shoe. When the parts are properly reversed or adjusted they may be locked in position by locking handle 153. The rotary carriage has upwardly extending brackets 154 at the front and rear, at the top end of which is trunnioned a longitudinally tilting carriage 155. This is adjustable by the screw device and hand wheel 156 to adapt the longitudinal tilt of the wiping mechanism to that of the shoe. The parts within the trunnion carriage 155 are rotatable therein about a longitudinal axis, by means of handle 157, which therefore can be used to alter the lateral tilt or slant of the wiping mechanism to suit the shoe. After the handle 157 is thrown forwardly or rearwardly as desired the screw device or wheel 158 may be turned to secure finer adjustment. The elements 148 to 158 thus described are substantially as in the prior patent, which shows the further details of the successive carriages and their relative movements in the operation of reversing the machine.

The complete reversing operation, including the transverse shifting of carriages 149 and 150 and rotation of carriage 152 may readily be effected as a single operation and from a single reversing handle 159 fulcrumed at 160 to the support 22. For this purpose the reversing lever 159 is connected by a link 161 with a member or block 162 located at the rear right hand portion of the swinging carriage 150. For convenience the block 162 may be one of the bearings for a transverse screw 163 employed, as in Patent 1,420,574, for the symmetrical adjustment of opposite stops or blocks 164 by which symmetry in the reversing operation is secured without the attention of the workman. By turning the hand wheel 165 this rotates the screw rod and adjusts the stop blocks 164 toward and from the axis of the swinging carriage as desired. In the prior patent the screw rod passed through a central block, utilized for connection to the reversing lever 159 but this prevented the stops 164 from being brought to the center, as is sometimes desirable with very straight shoes; the link connection 161 hereof, therefore, extends from the reversing lever 159 to the block 162 as described, the central block being omitted, increasing the utility of the machine. The symmetrical stop blocks 164 cooperate with a central stop pin 166 which may be similar to that in the prior patent and is thrown down at will by handle 167 to release the adjustment.

Figure 14:
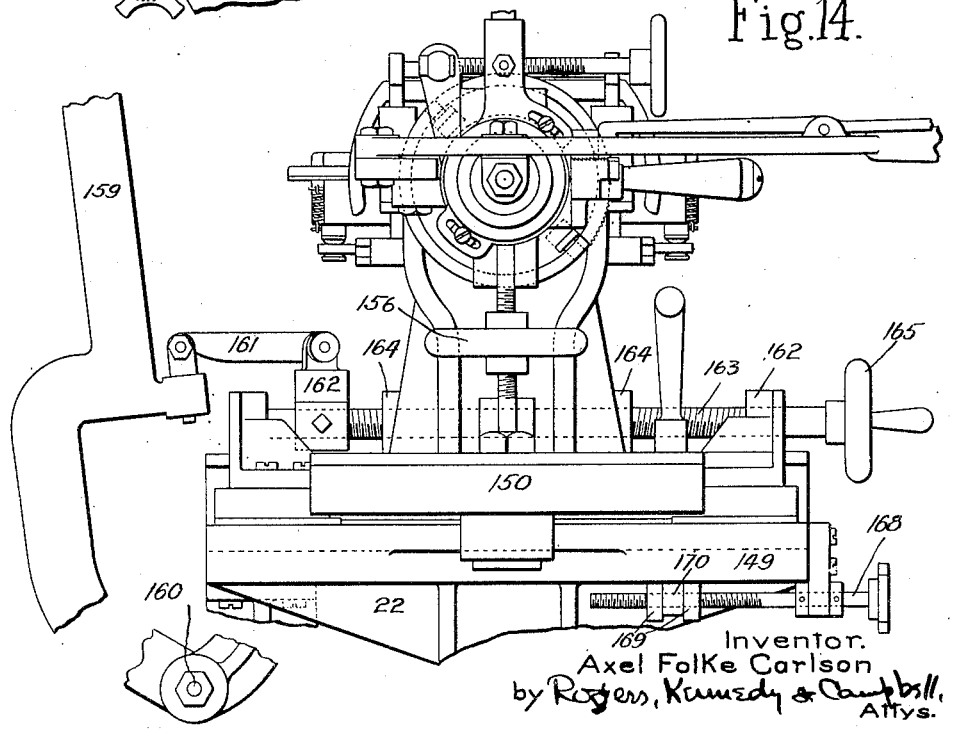
Fig. 14 is a left elevation of the mechanism seen in Fig. 13.

The symmetrical opposite positions of the base carriage 149 may be determined by a screw rod 168 controlling a pair of stops 169 cooperating with a lug 170 formed on the underlying support 22. Fig 14 shows them adjusted against any reversing movement; in practice the blocks 169 will be substantially separated. The symmetrical reversal of the rotary carriage or disk 152 may be automatically effected by toothed gears or racks, indicated at 171, and more fully disclosed in the prior patent.

An important feature of the present invention is an alining device for the toe rest, by which it is automatically adjusted into alinement with the toe wiping mechanism, and remains in such alinement throughout any reversals or adjustments of the wiping mechanism or for that matter of the toe rest itself. The present invention is characterized by the absence of any movement of the toe wiping mechanism toward and from the position of the shoe. The heel wiping mechanism is so bodily movable, but on the other hand does not swing laterally to adjust its wiping angle to the shoe, this being taken care of in the toe wiping mechanism. As already described the toe and heel rests are both longitudinally adjustable independently of each other and of both wiping mechanisms. Thus the toe rest can be adjusted toward and from the wiping mechanism, along the top surface of the bracket 53, and fixed by the handle 58, the toe rest support 52 swiveling or rotating on the bracket as already described. While this swiveling of the toe rest to suit the shoe might be performed manually there is herein shown the automatic alining device mentioned, best shown in Figs. 1, 13 and 18. This may consist merely of an alining arm 172 pivotally secured to the upstanding brackets 154 of the rotary carriage 152, and extending to the right, thus taking always the same direction as the carriage 152 and the wiping mechanism, but being capable of swinging upwardly and downwardly as the toe wiping mechanism and toe rest relatively shift. This alining arm 172, beneath the toe wiping mechanism, is shown slidably engaged with a slotted alining arm 173 preferably rigidly connected with the support 52 of the toe rest. It will be remembered that the toe rest not only swivels upon the bracket 53, but the bracket is free to swing with its vertical supporting rod 63. The toe rest support is therefore universally movable in the plane of the top surface of the bracket 53. The described interengaging alining arms are thus able to keep the toe rest always in the correct position. The workman is thus relieved entirely of this operation, the toe rest requiring no attention after initial adjustment longitudinally as described.

The wiper operating carriage 174, seen in Figs. 13–17 is bodily slid toward and from the shoe for the performance of the wiping operations, and is capable of tilting rotation, its body being cylindrical for this purpose as shown. This carriage is mounted within the tilting carriage 155 and its forward or right hand end is extended in a form to support the carriers of the wiper plates and the mechanism for swinging them toward and from each other during the wiping operations. The wiping or sliding movements of the carriage 174 are shown effected by the usual wiping lever 175, having associated mechanism similar to that in the prior patent.

The forward or right hand end of the wiper operating carriage 174, extends beyond the tilting carriage 155, and as stated, supports the wiper plate carriers 176 on which are detachably mounted the wiper plates 177. These plates are preferably arranged not only to swing toward each other with the carriers beneath them, but to rotate on the carriers for the purpose of bringing reverse contours into position, enabling a speedy conversion of the machine for right and left shoes, this part of the mechanism being more fully disclosed in Patent 1,420,574. The two carriers are arranged to swing about the apex of the shoe as a center, or rather about the meeting point of the two wiper plates, which at times corresponds with the apex of the shoe, the carriers being mounted on curved dove-tail guides for this purpose, this movement insuring continuity of wiping plate outline during operations as explained in Patent 1,420,574.

The connections for swinging the carriers and wiper plates toward and from each other may comprise curved toothed racks 178 upon the rear of the opposite carriers 176, and pinions 179 engaging these racks, with relatively stationary racks 180, also engaging the pinions, so that when the wiper operating carriage is advanced the pinions will travel along the fixed racks and thus swing the wiper plates. In Patent 1,420,574 these longitudinal racks were altogether stationary, but in the present improvement provision is made for initial adjustment of them toward right and left, this enabling the initial position of the wiper plates to be varied somewhat, which is useful so that slight changes in shoe toe contour will not always require the substitution of interchangeable wiper plates. Thus if the racks 180 should be adjusted slightly to the left this will throw the wiper plates slightly toward each other in their initial position and adapt them to a somewhat more pointed shoe. For this purpose the racks 180 are shown having their left ends attached to a cross member 181, which may be in the nature of a ring, extending around the carriage 174 for connection with the racks at the opposite sides. The cross member 181 is shown as engaged by two longitudinal links or slides 182 extending to the left. The left ends of these links are provided with pins engaging in cams 183, formed in a transverse ring 184, surrounding the carriage 155. A handle 185 is secured to the ring, permitting it to be turned in one direction or the other and thus, through the cams and links, shifting the cross member 181 and the racks 180 as described. A spring latch member or handle 186 is associated with the handle 185, and has a tooth engaging a rack 187 on the carriage 155, thus locking the adjusting ring in any desired position, and rendering the racks 180 stationary in their adjusted position.

Figure 13:
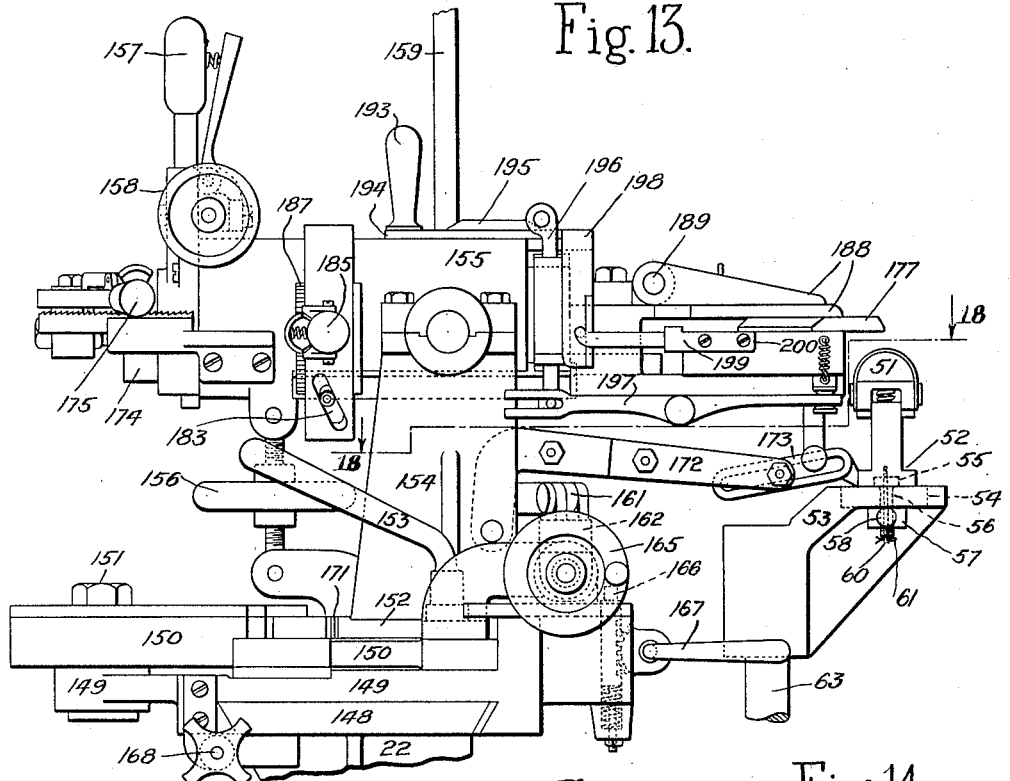
Fig. 13 is an enlarged front elevation of the toe wiping mechanism or head.
Figure 15:
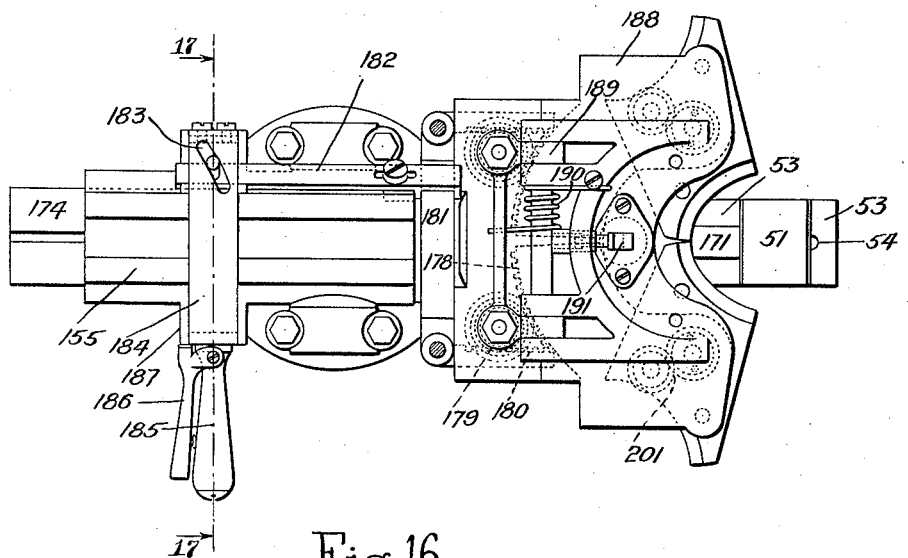
Fig. 15 is a top plan view of the upper portions of the toe wiping mechanism.
Figure 16:
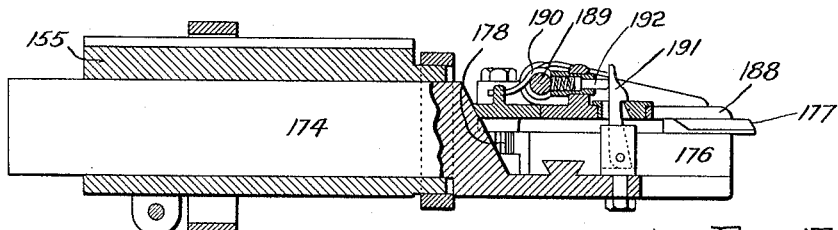
Fig. 16 is a central vertical section of the mechanism seen in Fig. 15.
Figure 17:
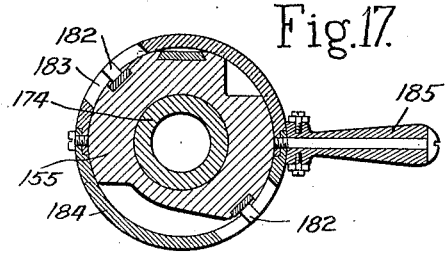
Fig. 17 is a detail shown in section on the line 17—17 of Fig. 15.
Figure 18:
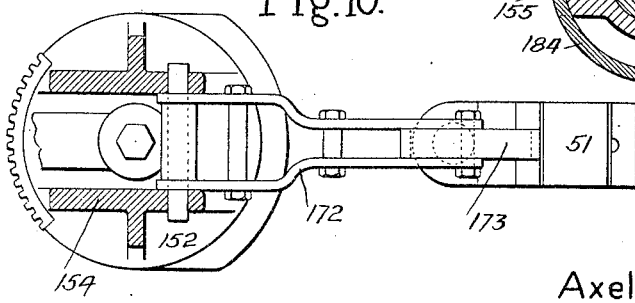
Fig. 18 is a top plan view partly in section on the line 18—18 of Fig. 13.

Another improvement, facilitating access to the wiper plates and interchange for operating on different shoes, is a latched, spring lifted cover plate 188, best seen in Figs. 13, 15 and 16. This plate has a flat underside bearing upon the top surfaces of the wiper plates, holding them in their own plane during operations. The ready opening of the cover plate gives instant access to the wiper plates, which are removable instantly because engaged on the carriers only by pins and recesses as indicated. It will be understood that without opening the cover plate the wiper plates can be reversed for right and left shoes as described, and can be initially swung into different adjustments as described, and can be moved toward and from each other in the actual wiping process. With changes of shoe shapes however the wiper plates will have to be removed and others inserted, an operation sometimes occurring frequently during a day's work. The cover plate 188 can swing upwardly about its hinge 189 and is pressed upwardly by a spring 190 surrounding the hinge. A recess in the cover plate is engaged by a latch 191 pivoted at its lower end to the carriage 174 and its upper or hooked end engaging and holding down the cover plate. A spring pressed finger 192 is arranged to hold the latch in its locking position as shown. It is only necessary to press or tap the latch to the left, permitting the cover plate to spring automatically into upright position. When the wiper plates are changed the cover plate may be thrown down by hand and becomes secured again in its operative position.

For reversing the wiper plates for right and left shoes a handle 193 is shown, upstanding from the slide 194, which may be thrown to the right and left to effect the reverse. The first part of the slide movement in either direction brings into play a cam 195 mounted on the slide in a manner to elevate the opposite vertical rods 196, the lower ends of which are connected to swing a pair of longitudinal levers 197, which depress the locking pins which prevent rotation of the wiper plates on their carriers. In this way the wiper plates are rendered free to be reversed. The actual reversing may be effected by a cross member 198, secured on the slide 194, this cross member connected by rods 199 which extend to the right and carry racks 200, engaging pinions 201 which effect the rotation of the wiper plates to reverse them, substantially as in Patent 1,420,574.

The heel wiping mechanism is wholly supported on a tilting carriage 210 fulcrumed at the top of the fixed brackets 23 on the base of the machine. The carriage 210 has spaced apart longitudinal tracks or guides 211 and between these a ratchet toothed rack 212 acting, as will be described, for holding the wiping mechanism in its advanced position. The tilting of carriage 210 may be effected by a link 213 containing adjusting wheel 214. This enables the heel wiping plates to be adjusted to suit the tilt of the shoe. The tilting carriage 210 has an inward or leftward extension 215 which constitutes a guide or slideway on which the heel spindle carriage 120 may slide longitudinally for adjustment purposes, as already described. See Figs. 1, 2, 7, 8 and 10.

Engaged on top of the tilting carriage 210 is a sliding carriage 218 by which the heel wiping mechanism may be brought bodily toward the shoe and retracted. While the advance of the carriage may be by hand or power it is preferred to retract it automatically or by spring, and for this purpose a wire cord 219 is shown attached to the right end of the carriage and extended around a pulley 220 to a spring 221 which thereby constantly pulls the carriage from the shoe. The sliding carriage 218 has upstanding brackets 222 forming guides for a vertically adjustable carriage 265 to be described later.

An improvement, greatly facilitating the adjustment and operation of the machine, is the employment of a single means for initial adjustment of the heel rest carriage 120 and for longitudinal shifting of the sliding carriage 218. As an example this may be as follows. A toothed rack 225 is shown sliding on top of the tilting carriage 210 between the tracks 211 and beneath the sliding carriage 218. This rack has teeth along its upper side, and its left or inner end is secured by its flange 226 to the heel rest carriage 120, see especially Figs. 7 and 8. A pinion 227 mounted on shaft 228 is shown engaging the rack 225, the shaft having its bearings on the sliding carriage 218. If now the heel rest carriage 120 is unlocked from its supporting guide 215, the turning of the pinion 227 will move the heel rest toward the right or left. If, however, the carriage 120 is locked in position the turning of the pinion will bodily throw the sliding carriage 218 toward the right or left. The shaft 228 carrying the pinion is shown as having a hand wheel 230 at its front end. The operator thus can readily adjust the heel rest by simply turning the hand wheel 230 until the shoe is in proper position. By then locking the heel rest the hand wheel becomes operative for throwing the heel wiping mechanism to right or left. Turning the wheel counter clockwise, in Fig. 1, brings the heel wiping mechanism up to the shoe where it will become locked as to be described. As the heel wiping mechanism is quite heavy, it is desirable to reduce the work of turning the hand wheel and for this purpose the following may be employed. The periphery of the hand wheel 230 is shown as formed with ratchet teeth 231 adapted to be engaged by a dog or pawl 232 mounted on an upstanding lever 233 which may thus be thrown by hand, giving increased leverage to operate the wheel. The lever may be vibrated and the shifting of the heel mechanism progressively effected. The normal position of the handle 233 is as seen in Fig. 1, and it is desirable to render the dog 232 inoperative, which is done by a fixed plate or cam 234 against which the dog contacts, as shown, thus disengaging it from the teeth of the hand wheel and at the same time affording a stop for the hand lever.

By providing power connections the work of bringing the heel mechanism to the shoe may be still further facilitated, thus reducing the arduous labors of the workman, and increasing quantity and quality of the output. Power adjustment of the heel mechanism may be effected by connections from the motor 27 to the shaft 228. For this purpose the shaft is formed with a hollow enlargement 236 at its rear end within which is keyed a sliding stud 237 having an enlarged collar 238 to which a clutch cone 239 is secured. The parts 237–239 are pressed forwardly by a spring 240. They may be thrown rearwardly to close the clutch by means of a yoke member 241 engaging opposite sides of the hub of the cone 239, and a clutch rod 242 carrying the yoke 241. This rod is shown extending to the front and operated by a clutch lever 243 which may be pulled forwardly to throw the clutch cone rearwardly, thus applying power to the shaft 228. The outer clutch cone 245 is carried on a short shaft or stud 246 mounted in a bearing or bracket 247. The clutch cone 245 may be rotated through a bevel gear 248, mounted on the shaft 246, engaged by a bevel gear 249 mounted at the upper end 250 of an upright shaft turning in a fixed bearing or bracket 251. The shaft 250 extends downwardly, as seen in Fig. 2, and has universal joints at both ends, with a telescope section 252 in the middle, so that power connection can be maintained notwithstanding any sliding, shifting or tilting movements of the carriage 218. The lower section 253 of the shaft may be provided with a worm wheel 254 engaged by a worm 255 on the shaft 28 of the motor 27. By this means, after the heel rest carriage has been adjusted and set, the workman may simply pull the lever 243 and thus cause the power connections to throw the heel mechanism inward into position against a shoe. The clutch 239, 245 being a friction clutch will readily slip when the parts reach position, thus avoiding damage.

A further improvement is to relieve the operator's hand even of the necessity of pulling the clutch lever 243 to apply power for shifting the heel wiping head. This may herein be done by means of the pedal 38 already described as used for pulling the hold-down into position. It has been described that normally the hold-down and its pedal are disconnected, but when the hold-down is swung around by hand above the shoe this couples or connects the lower end of the hold-down carrying rod 98 with the slide bar 108 that is connected to the pedal. Fig. 2 shows these parts, the rod 98 having a cam extension 104 and a pin 105 which pin, when the rod 98 is rotated, engages with the recess 109 in the bar 108. Obviously any depression of the pedal without having swung the hold-down forward would be without effect as the pin 105 would not have engaged the bar 108. The present feature utilizes the pedal 38, which can be depressed while the parts are in the condition stated, so as to apply power to bring the heel wiping mechanism to position. For this purpose a depressible bar 256 may be located directly beneath the extension 104 in its normal position, seen in Fig. 2. If the pedal be depressed while the hold-down is out of position the projection 104 will descend upon the depressible bar 256 and throw it down, thus closing the power clutch, for example as follows. The bar 256 is shown as being spring pressed upwardly within a guiding slideway 257. Also it is formed with an incline or cam surface 258 cooperating with the free end of a horizontally swinging lever 259. The depression of the pedal 38 thus throws the lever rearwardly, while the other or forked end of the lever is thus thrown forwardly to engage the members of a friction clutch 260 on the motor shaft 28. It is to be understood that this structure is an alternative to the clutch connections 236–245, the latter clutch to be maintained closed with the former normally open. Thereby, when the time has come to bring the heel wiping mechanism to the shoe the operator has merely to depress the pedal 38, leaving his right hand free to effect lateral tilting or other adjustment of the wiping mechanism as it comes into operating position.

In whatever manner the heel wiping mechanism is brought to the shoe it will there be held, until released, by a pawl or dog 262 arranged on carriage 218 to engage the toothed rack 212 on carriage 210. The pawl at any time may readily be removed from the rack by a releasing handle 263, although as will be later described, the release of pawl may be done automatically when the trip mechanism is operated, so that when the shoe is completed the operation of the trip mechanism restores this part of the machine to initial position.

The upright guides 222 on the sliding carriage 218 accommodate between them the rising carriage 265, the carriage having confining plates 266 engaging the guides. The actual elevation of the carriage 265 may be effected by screw rod 267, shown in Fig. 1, this carrying a gear 268 which is engaged by a pinion 269 on an upright shaft 270, see Fig. 2, having a crank 271 at the top, by which the rising carriage and heel wiping mechanism may be vertically adjusted.

The rising carriage 265 gives support to a cylindrical carriage 275 which can rotate about a longitudinal axis in the hollow interior of the rising carriage to change the lateral tilt of the heel wiping mechanism, see Figs. 4, 5 and 6 in connection with Figs. 1 and 2. The tilt may be adjusted by the handle 276 as the heel mechanism is brought bodily up to the shoe. The cylindrical carriage may be a built up structure and at its forward or left end provided with an enlargement 277 giving support to the heel clamping pad and wiper plate.

The heel clamping pad 279 may be a self adjusting structure of a form similar to Patent 1,420,573 and is shown carried at the forward end of a shank 280 movable in the lower part of the cylindrical carriage.

The wiper plates 282 may be symmetrical plates arranged to swing about the apex of their contour as a center through curved guiding means 283, formed on a wiper carriage 284 which is fitted to slide longitudinally in the upper part of the cylindrical carriage.

The wiping movements consist of a bodily shift of the wiper carriage toward and from the shoe combined with swinging movements toward and from each other of the wiper plates. As will be explained a double lever movement is provided such as to move the entire mechanism leftward toward the shoe and at the same time to swing the wiper plates toward each other.

The bodily leftward movement of the wiper carriage 284 may be effected from an operating lever 285 fulcrumed to a fixed bracket 286. The lever is shown having an angle piece 287 swivelled to its lower side and a connecting rod 288 extending therefrom to the left and there screw threaded into an upstanding lug 289 on a plate 290 connected to the wiper carriage 284. When the lever 285 is thrown to the left this bodily moves the wiper carriage and wiper plates toward the shoe.

The swinging movements of the wiper plates are effected by a second lever 292. This has its fulcrum on a link 293 connected to the bracket 286 at a point considerably further to the rear than the fulcrum of the wiper carriage lever 285. As a consequence, when the two levers are thrown at the same time the wiper plate lever will give a greater throw than the wiper carriage lever, thereby causing the converging swinging movements of the wiper plates. The front ends of the levers are pivotally connected by a pin and slot device 294 and a handle 295 is applied to one of the levers for the purpose of operating both of them.

The connections from the lever 292 to the wiper plates may comprise a swivelled block 296 beneath the lever 292 and a pin 297 connecting the same to a leftwardly extending bar 298 fitted to slide in the middle part of the cylindrical carriage 275. At its left end the sliding bar carries a transverse plate or head 299 having opposite circular recesses engaged by links 300 extending therefrom leftward to similar recesses in the wiper plates 282. Relative leftward or inward movement of the head 299 will cause the plates to swing toward each other. Owing to the differences in the fulcrums of the operating levers 285 and 292 the head 299 will move toward the left more rapidly than the wiper carriage 284, so that links 300 will transmit swinging motion to the wiper plates.

This simple and effective arrangement affords a very convenient operation of the plates and permits certain adjustments. For example, the wiper plates may be initially adjusted more or less toward each other so as to make them adaptable for shoes of different sizes, thus minimizing the necessity of changing wiper plates for changes of shoes. Such initial adjustment may readily be made by turning the screw threaded rod 288. For this purpose its rear or right end is shown as provided with a knurled head 291. If this be turned so as to retract the wiper carriage 284 to the right, this causes the links 300 to throw the wiper plates slightly toward each other, giving the desired initial adjustment.

It remains only to describe the automatic tripping or release of the heel wiping head after a shoe is completed, namely by removing the pawl 262 from the rack 212 so that the spring 221 can pull the entire mechanism away from the shoe; the tripping connections comprising special devices for automatically resetting the parts in readiness for another similar operation. As already stated the release of the heel mechanism is preferably effected not directly from the tripper device 86, 87, but from the toe rest mechanism after it has been tripped. As seen in Fig. 3 the pushing of the trip rod 86 removes the dog 77 from the tooth 75, so that the spring 73 is able to rotate the shaft 69 and thus cause the descent of the toe rest 51. Fig. 1 shows the shaft 69 as extended through the frame or base of the machine and projecting outwardly at the right where it is provided with a short crank 305. From this crank the tripping of the heel mechanism is effected. When the heel mechanism is released and returns to the right it will be remembered that this operates the rod cam 142 to cause the release of the heel rest so that it can be thrown down by its spring 117.

Figure 10:
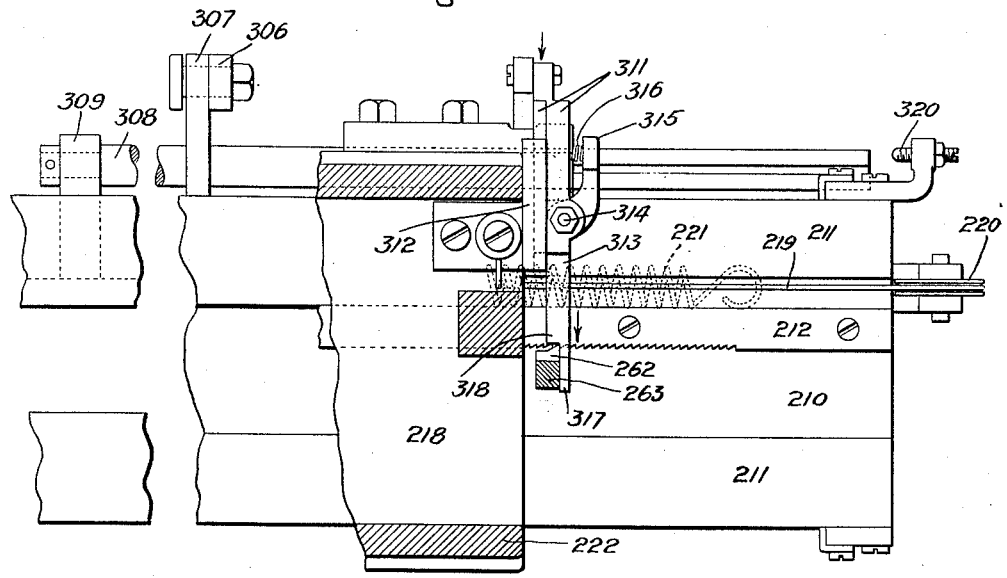
Fig. 10 is a top plan view of the sliding base parts of the heel wiping head, the supporting bed therefor, and the devices for locking and unlocking the head.
Figure 11:
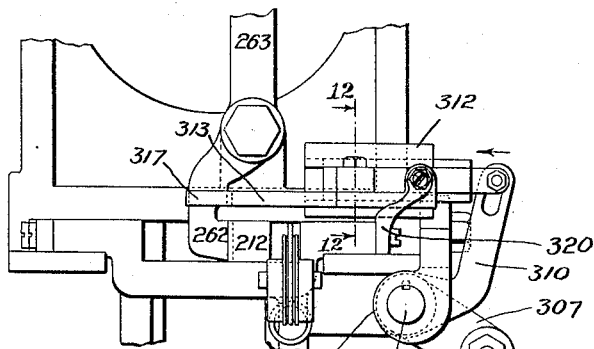
Fig. 11 is a right elevation of the parts seen in Fig. 10.
Figure 12:
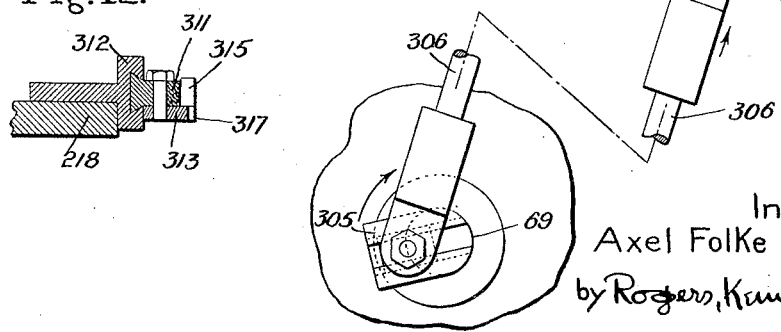
Fig. 12 is a detail shown in section on the line 12—12 of Fig. 11.

The connections by which the tripping of the heel mechanism is effected are best shown in Figs. 1 and 2 in connection with Figs. 10, 11 and 12. The crank 305 on the shaft 69 swings upwardly in the direction of the arrow in Fig. 11, when the toe rest mechanism is tripped. The crank 305 has adjustably connected to it the lower end of a connecting rod 306, the adjustment enabling regulation of the amount of throw of the rod. The tripping action causes the rod 306 to rise and this in turn swings upwardly a rock arm 307 on a rock shaft 308, mounted in bearings 309 on the sliding carriage 218. The tripping action therefore turns the rock shaft 308 counterclockwise in Fig. 11. This rock shaft at another point has an upstanding rock arm 310, the slotted upper end of which is connected by a stud with a trip slide 311 which is thus thrust forwardly in the tripping action, guided by a dovetail slideway 312. The trip slide 311 does not directly contact the pawl 262 which is to be released, but it carries for this purpose a trip finger 313 pivoted to the slide at 314 and having a rearwardly extending tail 315 pressed rightward by a spring 316, holding the parts in the normal position seen in Fig. 10. The trip finger 313 has forward extension 317 sliding along the side of the pawl 262 and keeping the parts in correct relative position, and a shoulder 318 which is arranged directly to contact the pawl and thrust it from engagement with the rack 212. The tripping motions described, including the forward movement of slide 311, give this action. This removes the pawl from the rack and permits the carriage spring 221 to operate through the cord 219 to retract bodily the carriage 218.

When the carriage 218 is thus freed and retracted to the right the tail 315 of the trip finger 313 eventually comes into contact with an adjustable stop 320. This causes the compression of the spring 316 and the swinging of the trip finger so that the shoulder 318 is swung to the right, thus releasing the pawl 262 and permitting it to reengage with the rack 212, preferably with the smooth side thereof beyond the ratchet teeth. The parts are thus preliminarily reset for a new operation, and when the toe rest is elevated by the depression of the pedal 36 this will operate through the connections 305 to 311 to retract the trip finger 313, thus permitting its shoulder 318 to again resume operative position to the rear of the pawl 262.

The operation of the machine, omitting certain understood details, such as the manipulation of the wire or other means for securing the wiped margins of the upper, may be substantially as follows. The shoe, on the last, will first be fitted to the heel rest and the heel rest then adjusted upwardly to the proper extent, the heel wiping mechanism being brought up near to the shoe to assist judging the proper adjustment of the heel rest. The toe rest may then be adjusted upwardly or downwardly in a similar manner and also adjusted longitudinally to suit the shoe, and locked in position. The entire heel wiping mechanism may then be brought inwardly to its final position with the clamping pad engaging the heel. This may be done by hand or by power as described. Any necessary tilting of the heel mechanism should be effected at this time as well as any slight up or down adjustment to bring the wiper plates to the exact level desired. The heel mechanism will then be tightened up to the shoe and locked in operative position. The toe rest may then be elevated to its proper position by its pedal. The shoe is now in readiness to have the heel end wiped, after any preliminary adjustment of the wipers toward or from each other. When through with this operation the wiper plates will be left in their inward position and the heel end of the shoe may then be forced upwardly by the pedal 37 to give a wiping pressure on the leather. Preferably the wiper plates are then retracted partially leaving the leather sufficiently exposed to apply tacks or other attaching means. The wiper plates may then be retracted from a shoe or if desired they could be left in position until a later period. The toe wiping head may then be elevated by the pedal 30 and adjusted if necessary as to lateral and longitudinal tilt and otherwise. The wiper plates may be initially adjusted toward or from each other in case of a change of shoe size. Before the wiping however the hold-down should be swung forward into position and brought down upon the toe end of the shoe by the pedal 38. As stated the hold-down becomes locked in its holding position. The wiping operations may then be performed by the wiper handle 175 in conjunction with the manipulation of the pedal 30. When completed the toe wipers may be retracted slightly and left in position temporarily. A light operation of the trip mechanism will then release the hold-down, which springs upwardly and swings away toward the rear. This enables fastening tacks or wire to be applied to the shoe upper. The lasting of the sides or shanks of the shoe and the securing of the leather may now be conveniently performed, as is usual in bed lasting machines. The toe wiper plates may then be retracted and the mechanism dropped to initial position. The heel wiper plates should at this time be fully retracted if not already retracted. The trip mechanism may now be fully operated to cause the toe rest to be released and dropped. This, through the shaft 69, as described, effects the release or tripping of the heel wiping mechanism, which thereupon automatically retracts to the right. This in turn effects the release and dropping of the heel rest or spindle. The parts are thus in initial position and the completed shoe may readily be removed. In order to wipe the mate of the shoe just wiped the toe wiping mechanism may now be thrown bodily across from the front to the rear of the machine and vice versa, by the lever 159, and the contour of the wiping plates may be reversed by the handle 193; thus conveniently and quickly placing the machine in adjustment for the other shoe.

It will thus be seen that I have described a lasting machine, including shoe supporting and holding means and wiping mechanisms for the toe end, and heel end, and operating mechanism, including tripping devices, embodying the novel principles of the present invention and attaining the objects and advantages recited. Many matters of design, arrangement, detail and structure may be variously modified without departing from the principles of the invention and therefore it is not intended to limit the invention to such matters except in so far as recited in the appended claims.

What is claimed is:

1. In a lasting machine, toe and heel wiping mechanisms, a heel support, an adjuster or wheel for adjusting the heel support toward and from the toe mechanism, the same operating from the heel mechanism, and means for clamping the heel support so that the said adjuster may then be used for adjusting the heel mechanism toward and from the shoe.

2. In a lasting machine a shoe support, a heel wiping mechanism, a hand wheel with a rim of substantial diameter adapted to be grasped for advancing the heel mechanism rapidly toward the shoe, means to hold the mechanism in advanced position, a lever adjacent the wheel, and means on the lever for engaging the wheel to turn it when the lever is oscillated, whereby the advancing of the mechanism can be forcibly completed and means for rendering the lever inoperative when not in use.

3. In a lasting machine, a shoe support, a heel wiping mechanism, a hand wheel for shifting the heel mechanism toward the shoe, a lever adjacent the wheel, a pawl on the lever engaging the wheel to turn it when the lever is oscillated, a fixed stop against which the lever rests when retracted, and means to render the pawl inoperative when the lever is retracted to its stop.

4. A lasting machine as in claim 1, and wherein is a power operated friction clutch adapted to be closed at will and arranged to cause the heel mechanism to be moved toward the shoe.

5. In a lasting machine, a frame, means for supporting the shoe, a carriage and wiping mechanism shiftable bodily toward the shoe, a shaft mounted in said carriage, connections whereby the rotation of the shaft shifts the carriage, a power shaft, a slip clutch between said shafts, and a clutch controller for closing the clutch at will to shift the wiping mechanism toward the shoe.

6. In a lasting machine means for supporting the shoe, wiping mechanism shiftable bodily toward the shoe, a power operated clutch for shifting said mechanism at will, a control lever, clutch connections whereby the lever may cause the closing of the clutch, means for rendering said connections inoperative, a hold down, a pedal, and connections controlled by said pedal for depressing the hold down, operative when said clutch connections are inoperative.

7. In a lasting machine shoe supporting means including a toe rest, toe wiping mechanism angularily adjustable to the supported shoe, and connections between the toe mechanism and toe rest for swingingly alining the latter with adjustments or reversals of the former.

8. In a lasting machine shoe supporting means including a toe rest, toe wiping mechanism angularly adjustable to the supported shoe, and means for adjusting the toe rest longitudinally to the toe mechanism, and angularly according to the angle of wiping action thereof.

9. In a lasting machine means for supporting a shoe in wiping position including a toe rest mounted to turn about an upright axis, toe wiping mechanism swingable to adapt its angle of action to the axis of the toe, and a connection whereby the swinging of the wiping mechanism effects the turning of the toe rest to adapt it to the shoe.

10. A lasting machine as in claim 9 and wherein the connection comprises an axial extension rigid with the toe rest or wiping mechanism and an axial extension rigid laterally with the other thereof but loose vertically to permit relative vertical adjustment.

11. A lasting machine as in claim 9 and wherein the connection comprises an arm (as 173) extending from the toe rest, and a link (as 172) extending from the wiping mechanism, said arm and link inter-engaged to prevent lateral but permit vertical play.

12. In a lasting machine shoe supports, a hold down swingable over the shoe, and connections coupled by such swinging for effecting the lowering of the hold down.

13. In a lasting machine a hold down, a pedal, connections from the pedal for depressing the hold down, locking means to hold the parts, and tripping means for releasing the hold down, means for shifting the released hold down from above the shoe, and means whereby such shifting disconnects the hold down from the pedal.

14. In a lasting machine, a heel support, heel wiping mechanism, means to lift the support to the wiping mechanism, comprising a vertically sliding shank, having a stop member thereon, a stop abutment for said member when the support is lowered, and means for adjusting said stop member on said shank.

15. In a lasting machine, toe wiping mechanism, heel wiping mechanism, shoe holding means comprising a heel support, a heel support carriage shiftable toward and from the toe wiping mechanism, means on said carriage for lifting the heel support, and a universal shaft maintaining connection with said lifting means in all positions of the carriage.

16. In a lasting machine, toe wiping mechanism, heel wiping mechanism, shoe holding means comprising a heel support, a heel support carriage shiftable toward and from from the toe wiping mechanism, means for adjusting the distance between the heel mechanism and said carriage whereby to adjust the position of the carriage, and means to lock the carriage whereby said adjusting means operates to shift the heel mechanism.

17. In a lasting machine wiping mechanism comprising wiper plates swingable toward and from each other for wiping the leather over the last, operating connections for so operating said plates, and means for initially adjusting such connections to adjust the outard positions of the plates more or less separated according to the shape or size of the shoe being lasted, said operating connections comprising carriers for the wiper plates, racks on the carriers, gears meshing with said racks, longitudinally moving racks for rotating said gears, and a wiping handle for actuating said racks, and said adjusting means comprises a device for shifting said racks initially relatively to the wiping handle.

18. In a lasting machine, wiping mechanism comprising wiper plates, a support above which the plates are operatively movable, a confining plate or cover above the plates hinged to swing upwardly to permit access to the plates, a spring tending to swing upwardly such cover plate, and a latch holding the cover plate in lowered position.

19. In a lasting machine for operating alternately on right and left shoes, means for holding a shoe, wiper plates and actuating mechanism operating in a line of action toward and from the shoe, a carriage bodily shiftable across the machine and swingable to set its line of action, symmetrical stops for determining the opposite positions of the carriage, means for symmetrically adjusting said stops from or toward each other according to the curvature of the shoe, a reversing lever, and a link connection from the reversing lever to a point at one side of the carriage.

20. In a lasting machine for operating alternately on right and left shoes, means for holding a shoe, wiper plates and actuating mechanism operating in a line of action toward and from the shoe, a carriage bodily shiftable across the machine and swingable to set its line of action, said shoe holding means comprising a toe rest swivelled to permit adjustment to the curvature of the shoe, and a connection from said carriage for adjusting said toe rest in accordance with the line of action of the wiping mechanism.

21. In a lasting machine shoe holding means and wiping mechanism, the latter comprising wiper plates movable as a whole toward and from the shoe and simultaneously swingable toward and from each other, and connections for actuating said plates comprising a carriage supporting the wiper plates, an operating member or handle, a connection from the handle to the carriage, and a connection from the handle to the wiper plates adapted to effect their swinging movements.

22. A lasting machine as in claim 21 and wherein the operating lever has slow actuating connections to the carriage, and faster moving connections to the wiper plates.

23. A lasting machine as in claim 21 and wherein the operating member has actuating connections to the carriage and other connections to the wiper plates, and means for initially adjusting one of such connections to set the plates toward or from each other according to the shape or size of the shoe.

24. In a lasting machine supporting means for the shoe, and a hold down, means for positioning and holding said supporting means and hold down, a tripper member or spring pressed rod arranged to release said supporting means and hold down, and a bunter fitted to strike and operate said tripper member.

25. A lasting machine as in claim 24, and wherein the tripper member is arranged to release the hold down upon a slight displacement and to release the support means up on a greater displacement, whereby the release operation may be controlled by the force of the bunter actuation.

26. A lasting machine as in claim 24, and wherein the bunter is a swinging member, hand operable to strike and shift the spring pressed tripper rod.

27. A lasting machine as in claim 24 and wherein the bunter is a swinging member, hand operable to strike and shift the spring pressed tripper rod, and arranged also to hold a shoe last when not engaged with said supporting means.

28. In a lasting machine a toe rest, a heel rest, a hold down, means for positioning said elements, means for locking each of them in position, a tripper member, means operated by the tripper member to release the hold down and means operated by the tripper to release one or both of said rests.

29. In a lasting machine a toe rest, a heel rest, a hold down, means for positioning said elements, means for locking each of them in position, a tripper member, means operated by the tripper member to release the hold down means operated by the tripper member to release the toe rest, and means operated by the released toe rest to release the heel rest.

30. In a lasting machine a toe rest, a heel rest, a hold down, means for positioning said elements, means for locking each of them in position, a wiping mechanism movable to the shoe and means for locking it in position, means for tripping the hold down and one of said rests, means operated by the released rest to release the wiping mechanism and the other rest.

31. In a lasting machine a toe rest, a heel rest, a hold down, means for positioning said elements, means for locking each of them in position, a wiping mechanism movable to the shoe and means for locking it in position, means for tripping the hold down and one of said rests, means operated by the released rest to release the wiping mechanism and means operated by the released wiping mechanism to release the other rest.

32. In a lasting machine shoe holding means and locking devices to hold them in position, a wiping mechanism movable bodily to and from the shoe and a toothed locking devices therefor, a tripping means for releasing the holding means, connections whereby the released holding means effects the release of the wiping mechanism, and means for resetting the wiping mechanism locking devices.

33. In a lasting machine shoe holding means and locking devices to hold them in position, a wiping mechanism movable bodily to and from the shoe and a toothed locking device therefor, a tripping means for releasing the holding means, connections whereby the released holding means effects the release of the wiping mechanism, a handle for releasing the wiping mechanism, and means for resetting the wiping mechanism locking devices.

In testimony whereof, I have affixed my signature hereto.

AXEL FOLKE CARLSON.